(12) United States Patent
Ito

(10) Patent No.: US 8,920,967 B2
(45) Date of Patent: Dec. 30, 2014

(54) ELECTRIC STORAGE ELEMENT AND PRODUCTION METHOD THEREOF

(75) Inventor: Syun Ito, Kyoto (JP)

(73) Assignee: GS Yuasa International Ltd., Kyoto-Shi, Kyoto (JP)

(*) Notice: Subject to any disclaimer, the term of this patent is extended or adjusted under 35 U.S.C. 154(b) by 0 days.

(21) Appl. No.: 13/523,743

(22) Filed: Jun. 14, 2012

(65) Prior Publication Data

US 2012/0321943 A1 Dec. 20, 2012

(30) Foreign Application Priority Data

Jun. 17, 2011 (JP) ................................. 2011-135166
May 15, 2012 (JP) ................................. 2012-111398

(51) Int. Cl.
*H01M 2/30* (2006.01)
*H01M 2/06* (2006.01)

(52) U.S. Cl.
CPC . *H01M 2/30* (2013.01); *H01M 2/06* (2013.01)
USPC ........................................ 429/178; 429/179

(58) Field of Classification Search
USPC ................................................ 429/178, 179
See application file for complete search history.

(56) References Cited

U.S. PATENT DOCUMENTS

| | | | |
|---|---|---|---|
| 6,579,640 B1 | 6/2003 | Nagase et al. | |
| 2003/0104276 A1 | 6/2003 | Mizuno et al. | |
| 2003/0143460 A1* | 7/2003 | Yoshida et al. | 429/181 |
| 2005/0095502 A1 | 5/2005 | Sugimune et al. | |
| 2008/0038627 A1 | 2/2008 | Yamauchi et al. | |
| 2009/0087737 A1 | 4/2009 | Yamauchi et al. | |
| 2009/0136841 A1* | 5/2009 | Watanabe et al. | 429/174 |
| 2010/0143786 A1 | 6/2010 | Kim | |
| 2010/0216008 A1 | 8/2010 | Yoon | |
| 2011/0052977 A1 | 3/2011 | Kurata et al. | |
| 2012/0148908 A1* | 6/2012 | Ito | 429/179 |

FOREIGN PATENT DOCUMENTS

| | | |
|---|---|---|
| JP | 2001-93486 A | 4/2001 |
| JP | 2003-173767 A | 6/2003 |
| JP | 2004-111300 A | 4/2004 |
| JP | 2008-66254 A | 3/2008 |

(Continued)

OTHER PUBLICATIONS

European Search Report dated Oct. 17, 2012.

(Continued)

*Primary Examiner* — Mark F Huff
*Assistant Examiner* — Olatunji Godo
(74) *Attorney, Agent, or Firm* — McGinn IP Law Group, PLLC

(57) ABSTRACT

There is provided an electric storage element and a production method thereof. The electric storage element has excellent air tightness at a portion connected with an external terminal and realizes high assembling performance, even in a simple configuration. The electric storage element includes casings, an external terminal that has a surface exposed outward from one of the casings, a current collector that is provided inside the casings and is connected to the external terminal, and an electrode assembly that is provided inside the casings and is connected to the current collector. The casings are provided with a through hole. The external terminal includes a flange in contact with an outer surface of one of the casings, and a first shaft that extends from the flange to be inserted into the through hole in one of the casings and be welded over the entire periphery.

14 Claims, 8 Drawing Sheets

(56) References Cited

FOREIGN PATENT DOCUMENTS

| | | |
|---|---|---|
| JP | 2009-087693 A | 4/2009 |
| JP | 2009-087727 A | 4/2009 |
| JP | 2009-087728 A | 4/2009 |

OTHER PUBLICATIONS

United States Office Action dated Mar. 21, 2014 in U.S. Appl. No. 13/316,226.
Japanese Office Action dated May 7, 2014.

* cited by examiner

ELECTRIC STORAGE ELEMENT AND PRODUCTION METHOD THEREOF

CROSS-REFERENCE TO RELATED APPLICATIONS

This application claims priority from Japanese Patent Application Nos. 2011-135166 and 2012-111398, the disclosure of which are incorporated herein by reference in their entireties.

BACKGROUND OF THE INVENTION

1. Field of the Invention

The present invention relates to an electric storage element and a production method thereof.

2. Description of the Related Art

JP 2009-087727 A and JP 2009-087728 A each disclose a conventional battery configured such that each of a body and a distal end of a shaft of an external terminal is sequentially inserted into a through hole provided in a cover and a shaft through hole provided in an insulator with a gasket being interposed therebetween, and is then inserted into a shaft through hole provided in a first plate, and thereafter the distal end of the shaft is caulked, so that the cover, the insulator, and the first plate are held and integrated by the external terminal.

Furthermore, JP 2009-087693 A discloses a configuration in which a rivet portion of a rivet is caulked so as to press a projecting contact body of a current collector, and then the rivet portion and the current collector are welded by laser beams to form a welded portion.

However, in the configuration disclosed in JP 2009-087727 A and JP 2009-087728 A, the cover, the insulator, and the first plate are simply held and integrated by the external terminal. In addition, the gasket and the insulator are essentially provided in order to keep air tightness in the battery. Such a configuration leads to increase of the number of components and complicated production steps, thereby resulting in increase of production costs. JP 2009-087693 A merely refers to a feature in the configuration, that the rivet portion and the current collector are welded by laser beams, and the object thereof is to simply achieve a rigid fixed state. Furthermore, JP 2009-087693 A neither describes nor suggests air tightness.

SUMMARY OF THE INVENTION

It is an object of the present invention to provide an electric storage element and a production method thereof. Such an electric storage element has excellent air tightness and strong connection at a portion connected with an external terminal, and realizes high assembling performance, even in a simple configuration.

According to a first aspect of the invention, an electric storage element includes a casing, an external terminal having a surface exposed outward from the casing, a current collector provided inside the casing and connected to the external terminal, and an electrode assembly provided inside the casing and connected to the current collector, wherein the casing has a through hole, and the external terminal includes a flange in contact with an outer surface of the casing, and a first shaft extending from the flange to be inserted into the through hole in the casing and welded thereto.

This configuration has a welded portion where the first shaft as part of the external terminal is fitted into the through hole in the casing. Therefore, it is possible to secure sufficient air tightness with no need for any extra sealing member.

According to a second aspect of the invention, the external terminal further includes a second shaft that has a diameter smaller than that of the first shaft, and extends from the first shaft to be fixed to the current collector.

When the second shaft as part of the external terminal is simply fixed to the current collector, the casing and the current collector are integrated with each other with no need for any extra component or work, and electrical connection is achieved between the current collector and the casing. Moreover, the second shaft is smaller in diameter than the first shaft. Accordingly, the first shaft is easily inserted into the through hole in the casing to be welded thereto, while the work is not disturbed by the second shaft.

According to a third aspect of the invention, the first shaft is inserted into the through hole in the casing, and with the flange being in contact with the outer surface of the casing, a stepped portion from the second shaft has a height substantially flush with an inner surface of the casing.

This configuration further facilitates the work of welding the first shaft.

The casing may comprise a battery case having an open surface, and a cover closing the opening of the battery case. The through hole of the casing may be provided in the cover.

According to a fourth aspect of the invention, the cover has an engagement receiver swelled outward, and the current collector has a fitting portion that is located in corresponding one of the engagement receivers and has a through hole into which the first shaft is inserted to be welded thereto.

According to a fifth aspect of the invention, the external terminal is a positive external terminal, and electrically connects the cover and the current collector when the current collector is fixed to the cover.

The positive external terminal equalizes potential of the cover and that of the current collector, with no need for extra work such as welding in order to electrically connect the cover with the current collector.

According to a seventh aspect of the invention, the first shaft is inserted into the through hole in the casing, and a contact portion therebetween is welded over the entire periphery.

The contact portion therebetween is welded over the entire periphery, so that the strength at the contact portion is increased to keep an excellent support state.

The electric storage element may be produced in the following manner. There is provided a method of producing an electric storage element including a casing, an external terminal having a surface exposed outward from the casing, a current collector provided inside the casing and connected to the external terminal, and an electrode assembly provided inside the casing and connected to the current collector, wherein the casing is configured by a battery case having an open surface and a cover closing the opening of the battery case, and the external terminal includes a flange, a first shaft extending from the flange, and a second shaft having a diameter smaller than that of the first shaft and extending from the first shaft. The method includes inserting the first shaft of the external terminal into a through hole provided in the cover, welding the first shaft of the external terminal to the through hole in the cover, inserting the second shaft of the external terminal into a through hole provided in the current collector, and caulking the second shaft of the external terminal so as to hold the cover and the current collector between the flange of the external terminal and the caulked second shaft.

According to the present invention, the external terminal is provided with the first shaft, which is fitted into the through hole in the casing and is welded thereto, so as to integrate the current collector with the casing. Therefore, it is possible to secure air tightness at the portion connected with the external terminal as well as achieve electrical connection between the current collector and the casing, with no need for any extra component.

DETAILED DESCRIPTION OF THE PREFERRED EMBODIMENT

Hereinafter, an embodiment of the present invention will be described with reference to the accompanying drawings. In the following description, terms indicating specific directions and positions (including "above", "below", "side", "end", and the like) are used as necessary. These terms are used just for the purpose of easier understanding of the invention with reference to the drawings, and these terms should not restrict by their meanings the technical scope of the present invention. Moreover, the following description provides merely an essential example, and should not be intended to restrict the present invention, application targets, or usage thereof.

Figure 1:
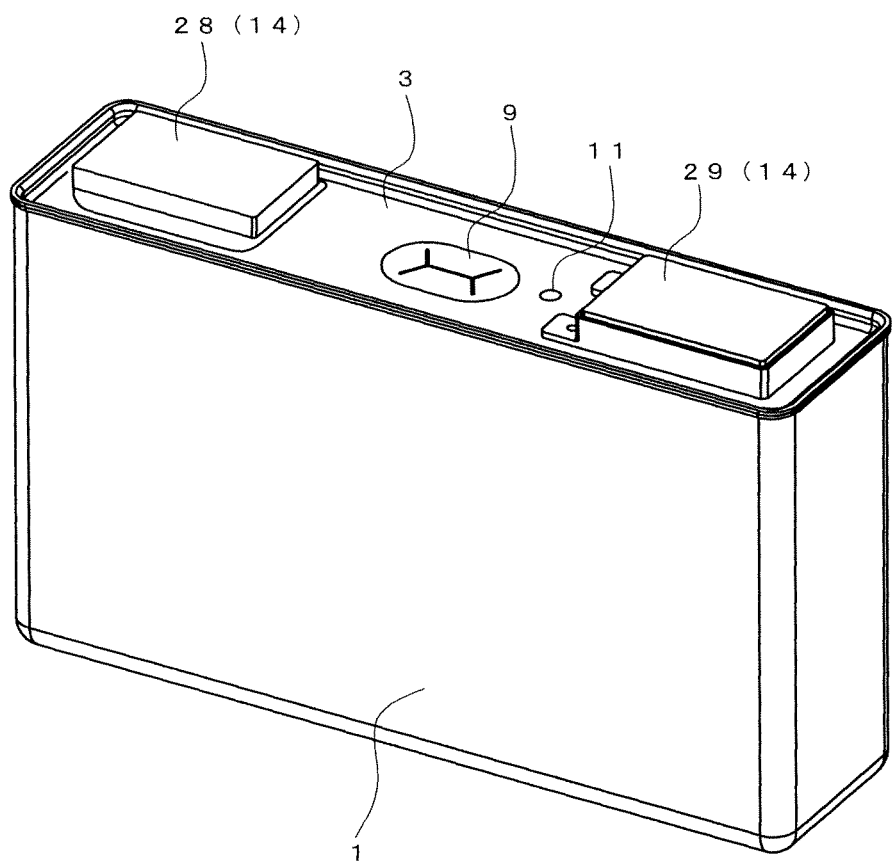
FIG. 1 is a perspective view of a battery according to an embodiment of the present invention.
Figure 2:
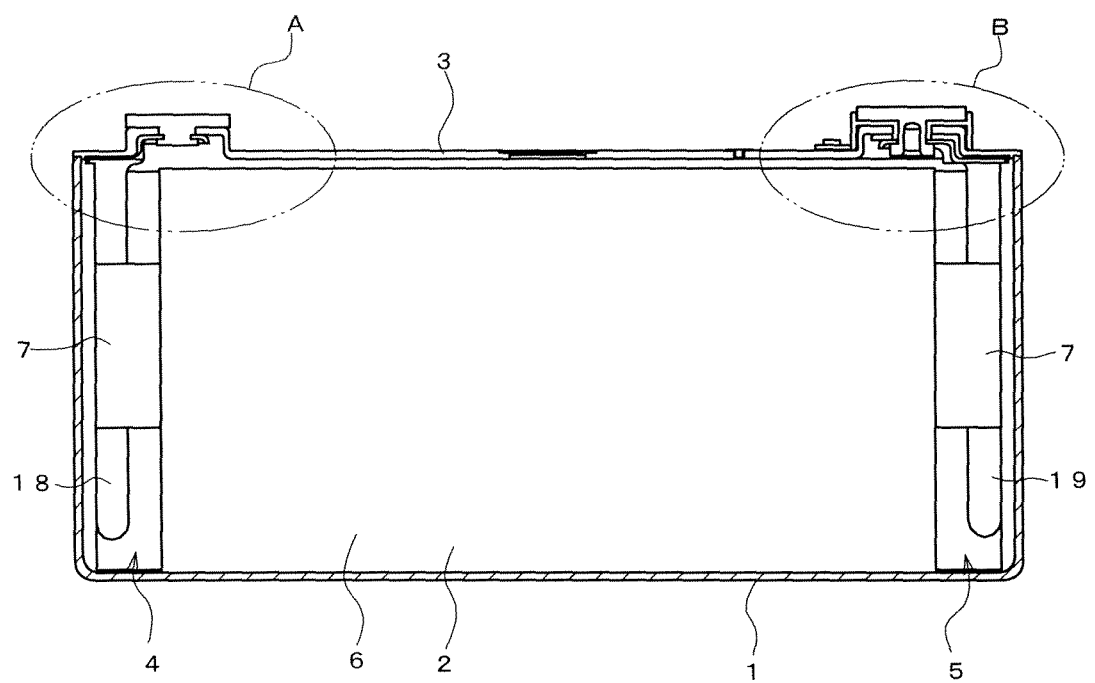
FIG. 2 is a front sectional view of the battery according to the embodiment of the present invention.

FIG. 1 shows a nonaqueous electrolyte secondary battery that exemplifies an electrochemical cell. As shown in FIG. 2, in the nonaqueous electrolyte secondary battery, a battery case 1 houses an electrode assembly 2 and is sealed with a cover 3. In this example, the battery case 1 and the cover 3 configure a casing.

The battery case 1 has a rectangular parallelepiped shape with an open upper surface, and is made of aluminum, an aluminum alloy, or the like.

Although not illustrated in detail, the electrode assembly 2 includes a positive electrode 4 made of aluminum foil, a negative electrode 5 made of copper foil, and a separator 6 made of a porous resin film and interposed between the positive electrode 4 and the negative electrode 5, similarly to a conventional electrode assembly. Each of these members has a belt shape, and the positive electrode 4 and the negative electrode 5 are each wound into a flat shape so as to be housed in the battery case 1 in a state where the positive electrode 4 and the negative electrode 5 are displaced from each other at the opposite ends in the width direction of the separator 6. As to be described later, a positive current collector 18 is connected to the positive electrode 4 with a clip 7 being interposed therebetween, and a negative current collector 19 is connected to the negative electrode 5 with a clip 7 being interposed therebetween.

Figure 3:
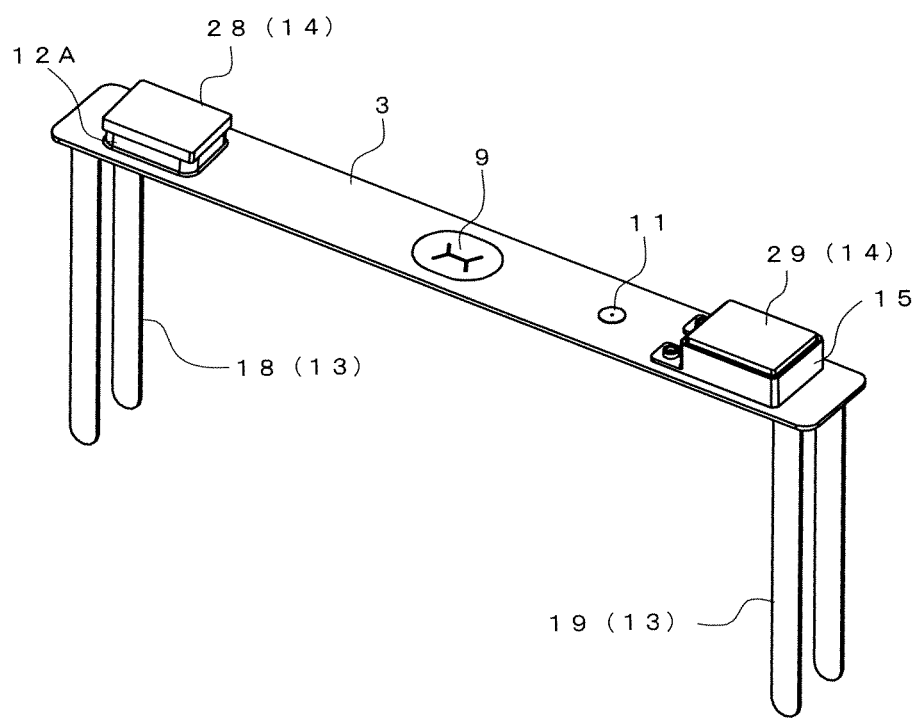
FIG. 3 is a perspective view, seen from above, of a cover shown in FIG. 1.
Figure 4:
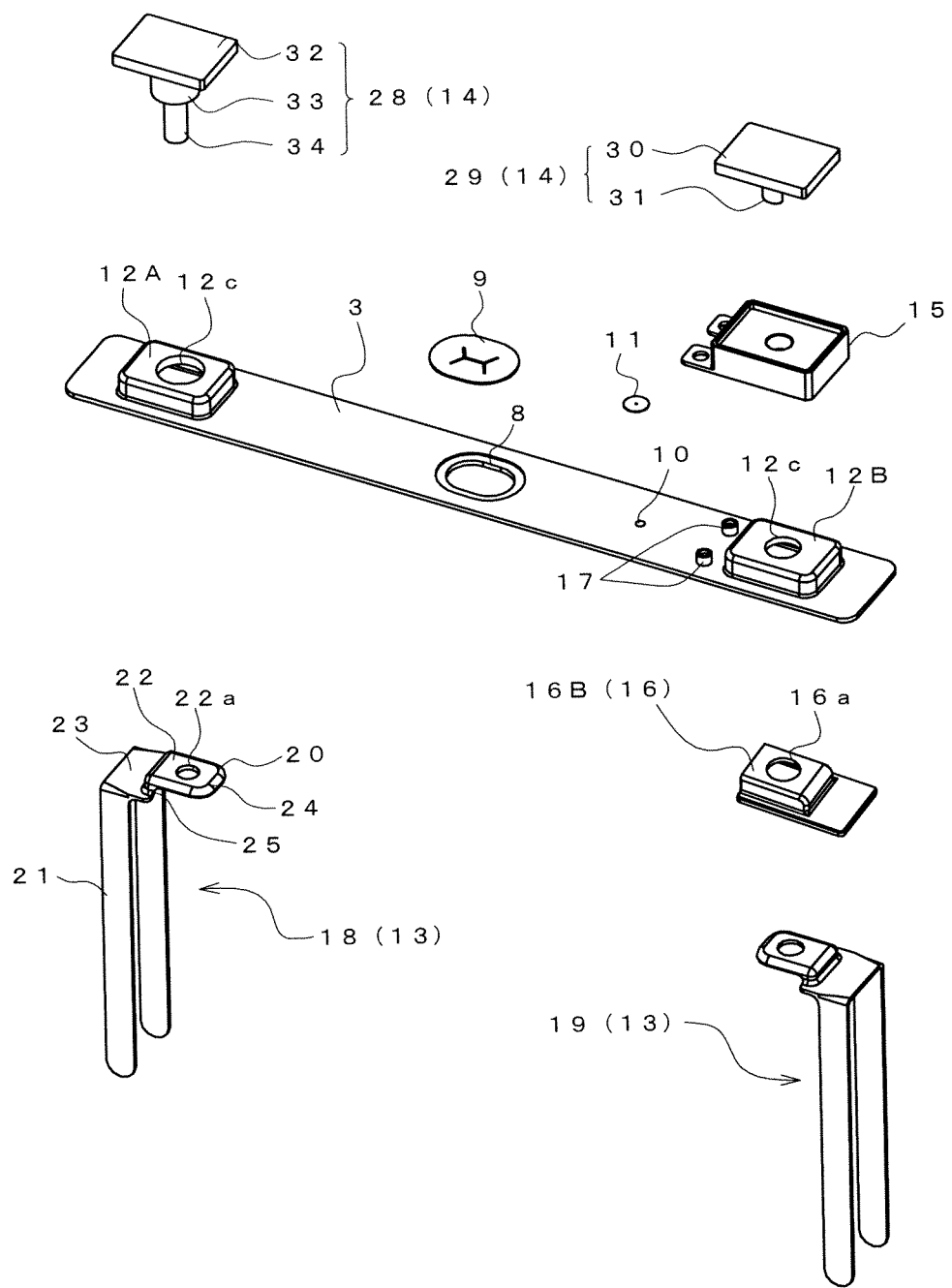
FIG. 4 is an exploded perspective view, seen from above, of the battery shown in FIG. 3.

As shown in FIGS. 3 and 4, the cover 3 is made of a metal plate in a long rectangular shape in a planar view, and is provided, in the center thereof, with an opening 8 that has a substantially elliptical shape and is formed to be stepped from the upper surface. A metal safety valve 9 is attached into the opening 8. The safety valve 9 is provided with a thin portion in a substantially H letter shape. The thin portion is torn in a case of abnormal increase in internal pressure, so that the pressure can be decreased.

The cover 3 has an end provided with a liquid injection hole 10 having a small diameter, and the liquid injection hole 10 is configured to be closed by a plug 11 after liquid is injected.

The cover 3 is provided, at the two ends, with a first engagement receiver 12A and a second engagement receiver 12B, respectively. The first and second engagement receivers 12A and 12B each have a rectangular shape in a planar view and are swelled upward. The cover 3 has a lower surface provided with a guide recess 12b. Moreover, a through hole 12c is provided in the center of a ceiling surface configuring each engagement recess 12a. A current collector 13 and an external terminal 14 are attached directly to the first engagement receiver 12A. On the other hand, another current collector 13 and another external terminal 14 are attached to the second engagement receiver 12B with an upper gasket 15 and a lower gasket 16 being interposed therebetween, respectively.

The cover 3 is provided, in the vicinity of inside the engagement receiver 12B in the longitudinal direction of the cover 3, with lock projections 17 that project upward from two positions in the width direction of the cover 3. Each of the lock projections 17 has a cylindrical shape provided with a bottom, and is formed at the same time when the cover 3 is pressed. The upper gasket 15, which is to be described later, is locked to the respective lock projections 17, so as to achieve positioning in a rotational direction.

The current collectors 13 are provided as the positive current collector 18 made of aluminum and the negative current collector 19 made of copper. Each of the current collectors 13 is formed by pressing a long metal plate, so as to be provided with a connection receiver 20 and legs 21 that extend from respective ends of the connection receiver 20. The connection receiver 20 is configured by a fitting portion 22 that is located in the engagement recess 12a of the cover 3 and a seat 23 that is formed continuously from the fitting portion 22. The fitting portion 22 is made flat and is provided with a through hole 22a in the center thereof. The fitting portion 22 has a peripheral edge provided with a guide edge 24 that is located on three sides and extends perpendicularly from the fitting portion 22. The remaining side of the peripheral edge of the fitting portion 22 configures a continuous portion 25 that extends longer than the guide edge 24 so as to be provided continuously to the seat 23. The guide edge 24 and the continuous portion 25 sufficiently enhance rigidity of the connection receiver 20 of each of the current collectors 13.

The legs 21 extend perpendicularly from the two opposite edges of the seat 23 so as to be located along both side surfaces of the electrode assembly 2. The legs 21 are connected to the positive electrode 4 or the negative electrode 5 of the electrode assembly 2 with the clip 7 (see FIG. 2) being interposed therebetween. Positional deviation can be prevented by the clip 7 that is held between the opposite inner surfaces of the battery case 1.

The external terminals 14 are provided as a positive external terminal 28 and a negative external terminal 29. Each of the external terminals 14 is configured by a flat plate 30 and a shaft 31 extending downward from the center of the lower surface of the flat plate 30. A bus bar (not shown) is connected by welding to the upper surface (exposed surface) of the flat plate 30.

The positive external terminal 28 is made of a conductive material such as aluminum and has a rivet shape and includes a flange 32, a first shaft 33, and a second shaft 34. The flange 32 has a rectangular shape in a planar view. The first shaft 33 projects from the center of the flange 32, and the second shaft 34 has a diameter smaller than that of the first shaft 33 and projects from the center of the first shaft 33.

The first shaft 33 is sized to have an outer diameter so as to be located in the through hole 12c in the first engagement receiver 12A provided on the cover 3 with no or substantially no gap being formed therein. The first shaft 33 is formed to have a height such that a stepped portion 35 between the first shaft 33 and the second shaft 34 is substantially flush with the inner surface of the cover 3 in a state where the first shaft 33 is inserted into the through hole 12c and the flange 32 is in contact with the outer surface of the cover 3. The first shaft 33 is inserted into the through hole 12c in the cover 3, and the contact portion therebetween is welded over the entire periphery in this state (by laser welding, micro TIG welding, or the like). Accordingly, the positive external terminal 28 can be attached to the cover 3 so as to sufficiently enhance air tightness, with no need for any extra member.

The second shaft 34 is sized to have an outer diameter so as to be inserted into the through hole 22a in the current collector 13, preferably with no or substantially no gap being formed therebetween. The second shaft 34 is inserted into the through hole 22a in the current collector 13 and is caulked in a state where the inner surface (lower surface) of the engagement recess 12a configuring the first engagement receiver 12A on the cover 3 is in surface contact with the upper surface of the current collector 13. In this configuration, the current collector 13 is fixed by the positive external terminal 28 welded to the cover 3, such that the current collector 13 is in intimate contact with the engagement recess 12a in the cover 3. In this state, the welded portion between the outer peripheral edge of the first shaft 33 and the inner peripheral edge of the through hole 12c in the cover 3 is completely covered with the fitting portion 22 of the positive current collector 18. Therefore, the welded portion can be kept in a favorable state.

On the other hand, the entire negative external terminal 29 is made of copper, and the flat plate 30 and the shaft 31 are formed integrally with each other.

The upper gasket 15 is made of a synthetic resin, such that the inner space of a frame having a rectangular shape in a planar view is divided by a partition 36 into an upper terminal holding recess 37 and a lower attachment recess 38. Tongue pieces 39 extend laterally from one of sides configuring an edge of a lower opening. Provided in the center of the partition 36 is a cylindrical portion 36a that extends downward from the ceiling surface. The cylindrical portion 36a is inserted into the through hole 12c in the second engagement receiver 12B and is fitted into a through hole 40a provided in the lower gasket 16. Lock holes 39a are provided in the two tongue pieces 39, into which the lock projections 17 on the cover 3 are inserted, respectively. The upper gasket 15 is provided along the second engagement receiver 12B that is located on the cover 3 and has a rectangular shape in a planar view, so that positional deviation of the upper gasket 15 can be prevented in the rotational direction by simply mounting the upper gasket 15 on the engagement receiver 12B. In addition, the lock projections 17 are inserted respectively into the lock holes 39a, so as to securely prevent such positional deviation in the rotational direction.

The lower gasket 16 is made of a synthetic resin, has a rectangular plate shape in a planar view, and is provided, in the center thereof, with a through hole 16a. The lower gasket 16 is located in the engagement recess 12a configuring the engagement receiver 12B, so as to seal the through hole 12c provided therein.

Reference is made next to a method of assembling a battery having the configuration described so far.

Figure 8:
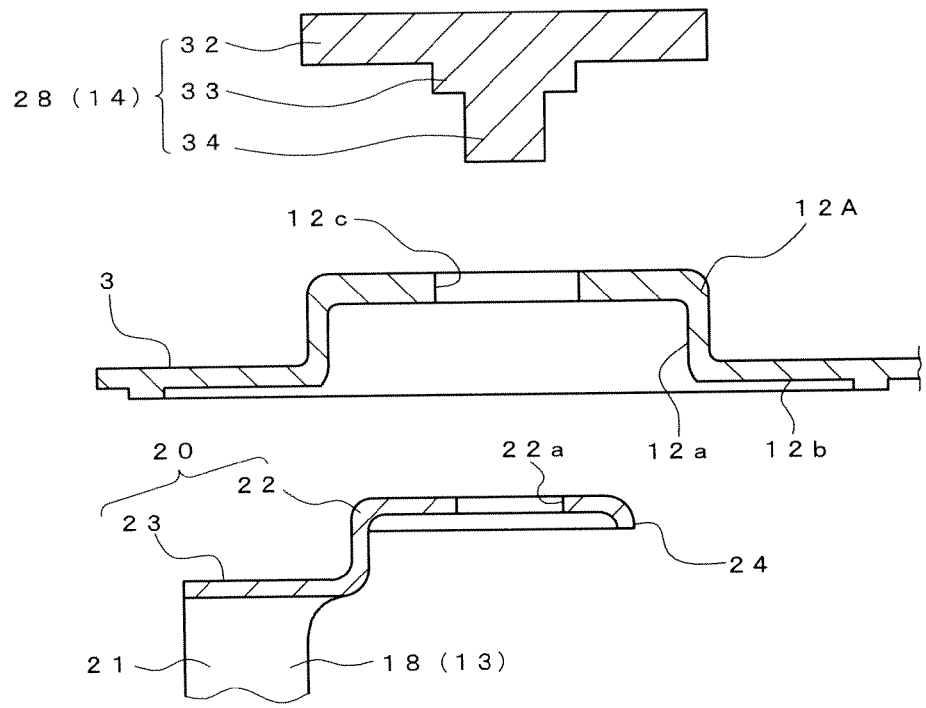
FIG. 8 is an exploded sectional view of FIG. 5.
Figure 9:
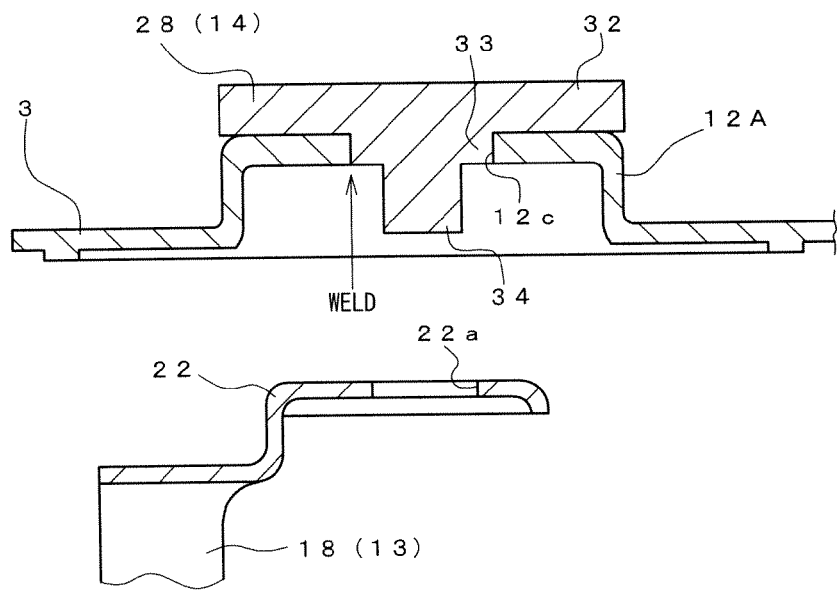
FIG. 9 is a sectional view showing a state where a positive external terminal is assembled to the cover from the state shown in FIG. 8.

At the engagement receiver 12A on the cover 3, as shown in FIG. 8, the second shaft 34 of the positive external terminal 28 is inserted into the through hole 12c from the outer surface (upper surface) of the engagement recess 12a, and as shown in FIG. 9, the flange 32 is brought into contact with the outer surface of the engagement recess 12a. In this state, the first shaft 33 is located in the through hole 12c, and the stepped portion 35 at the boundary between the first shaft 33 and the second shaft 34 is made substantially flush with the lower surface of the cover 3. Then, the adjacent (contact) portion between the outer peripheral surface of the first shaft 33 and the inner peripheral surface of the through hole 12c is sealed by laser welding or the like. Accordingly, the positive external terminal 28 is integrated to the cover 3, and also improved is air tightness in the through hole 12c, into which the first shaft 33 is inserted. The sealed portion is not the peripheral edge where the second shaft 34 projects, but the peripheral edge of the through hole 12c in the cover 3, in other words, a flat surface. This configuration facilitates the sealing work even by welding (in the case of laser welding, laser beams can be applied easily). Moreover, the sealed portion can be made flat with no projection being formed (even with any projection, the sealed portion can be refined easily).

Figure 5:
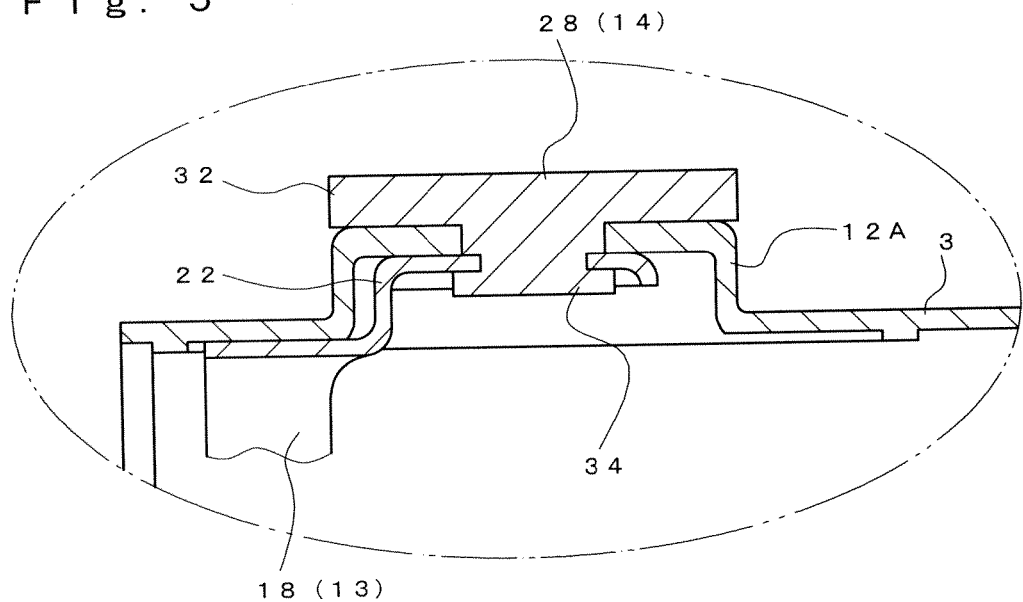
FIG. 5 is an enlarged view of a portion A shown in FIG. 2.
Figure 10:
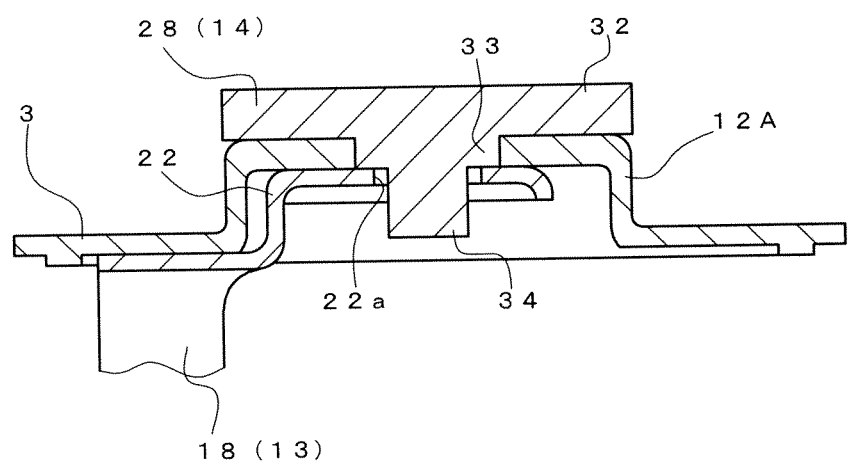
FIG. 10 is a sectional view showing a state where a current collector is further assembled from the state shown in FIG. 9.

As shown in FIG. 10, the fitting portion 22 of the connection receiver 20 configuring the current collector 13 is located in the engagement recess 12a in the first engagement receiver 12A, and the second shaft 34 of the positive external terminal 28 is inserted into the through hole 22a. The second shaft 34 is then caulked, so that, as shown in FIG. 5, the cover 3 and the fitting portion 22 of the current collector 13 are pressed against each other and are kept electrically connected to each other.

Figure 6:
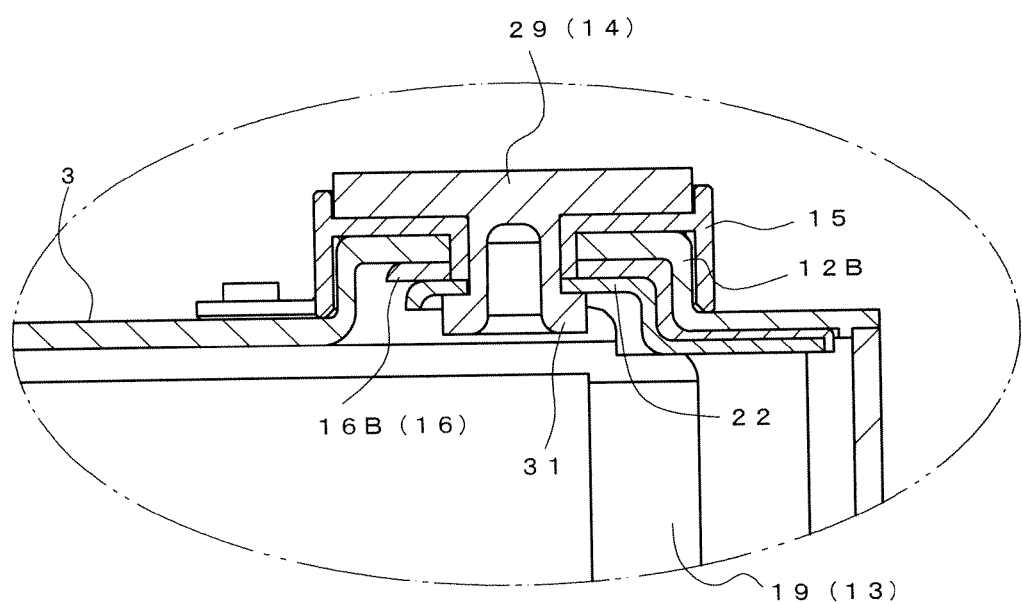
FIG. 6 is an enlarged view of a portion B shown in FIG. 2.
Figure 7:
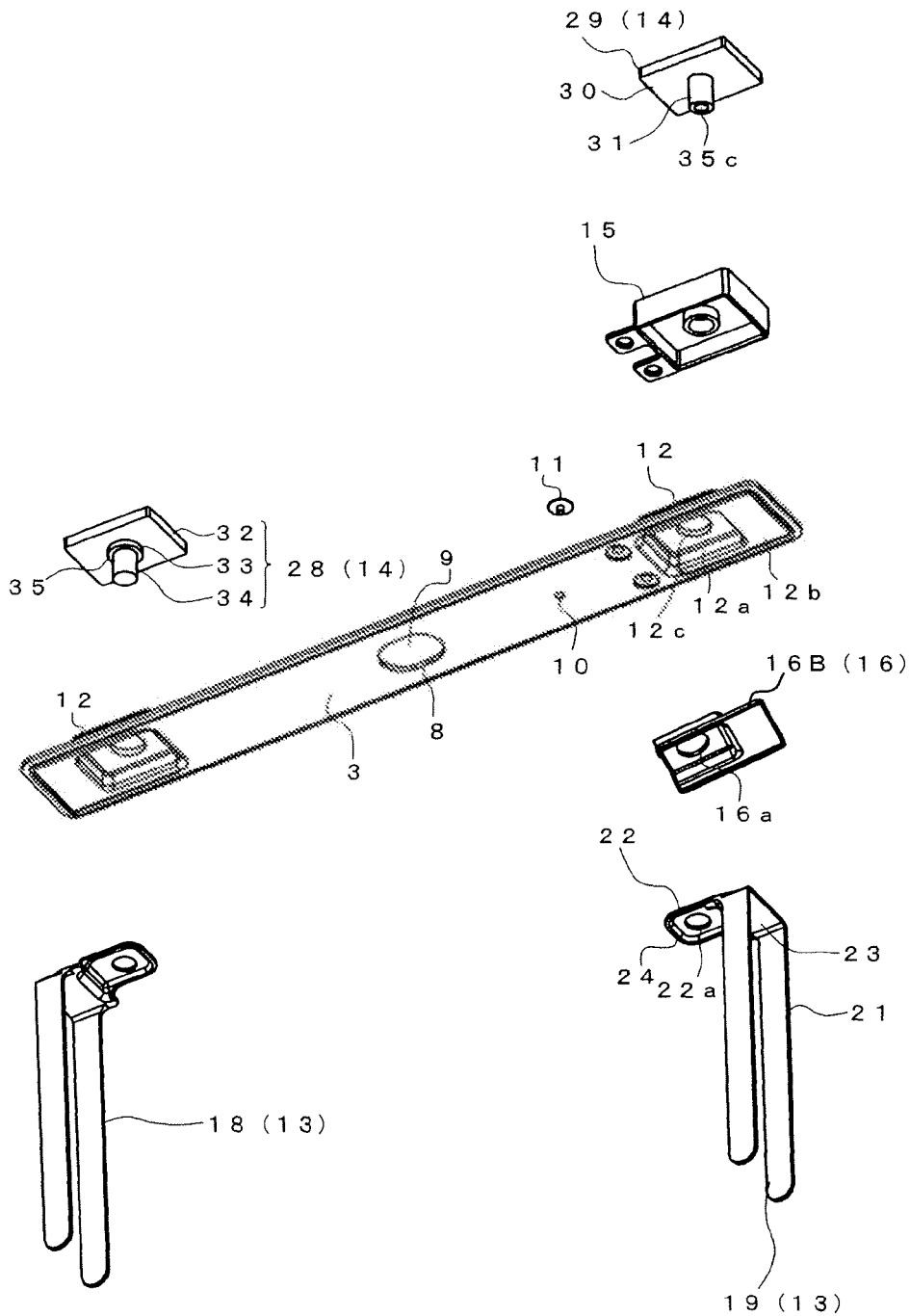
FIG. 7 is an exploded perspective view, seen from below, of the cover shown in FIG. 1.

At the second engagement receiver 12B on the cover 3, as shown in FIG. 6, the attachment recess 38 in the upper gasket 15 is attached to cover the swelled portion due to provision of the engagement recess 12a. In this state, the cylindrical portion 36a of the upper gasket 15 is attached into the through hole 12c in the cover 3, and the lock projections 17 on the cover 3 are locked into the lock holes 39a provided in the tongue pieces 39 of the upper gasket 15, respectively. The lower gasket 16 and the fitting portion 22 of the current collector 13 are sequentially located in the engagement recess 12a in the cover 3, and the shaft 31 of the negative external terminal 29 is inserted into the cylindrical portion 36a of the upper gasket 15, the through hole 16a in the lower gasket 16, and the through hole 22a in the fitting portion 22 of the current collector 13. Thereafter, the shaft 31 of the negative external terminal 29 is caulked, so that the upper gasket 15, the cover 3, the lower gasket 16, and the current collector 13 are held so as to be sandwiched thereby.

On the other hand, the separator 6 is located between the positive electrode 4 and the negative electrode 5, and the positive electrode 4 and the negative electrode 5 are each wound into a flat shape in a state where the positive electrode 4 and the negative electrode 5 are displaced from each other at the opposite ends in the width direction of the separator 6, thereby to form the electrode assembly 2.

The electrode assembly 2 thus formed is located between the legs 21 of the respective current collectors 13 that are fixed to the cover 3, and each of the positive electrode 4 and the negative electrode 5 is electrically connected with the corresponding legs 21 by means of the corresponding clip 7. The electrode assembly 2 thus connected to the legs 21 is housed in the battery case 1 together with a nonaqueous electrolyte. Thereafter, the edge of the opening of the battery case 1 and the cover 3 are sealed to each other by welding, so that a complete battery is obtained.

It is noted that the present invention is not limited to the configuration described in the above embodiment, but can be modified in various manners.

For example, in the above embodiment, the current collector 13 is caulked and fixed, by the positive external terminal 28, to the engagement recess 12a provided in the cover 3. Alternatively, the current collector 13 may be caulked and fixed, by the positive external terminal 28, to the cover 3 having a flat shape provided with no engagement recess 12a.

Furthermore, the above embodiment refers to the battery as an example of an electric storage element. Alternatively, the present invention is applicable in a similar manner to a capacitor or the like.

The structures of the external terminals 14 for the battery according to the present invention may be applied to various batteries such as a lithium ion battery and a lead storage battery.

What is claimed is:

1. An electric storage element, comprising:
a casing;
an external terminal comprising a surface exposed outward from the casing;
a current collector provided inside the casing and connected to the external terminal; and
an electrode assembly provided inside the casing and connected to the current collector,
wherein the casing comprises a through hole, and
wherein the external terminal includes:
a flange in contact with an outer surface of the casing; and
a first shaft extending from the flange to be inserted into the through hole in the casing and directly welded to the casing.

2. The electric storage element according to claim 1, wherein the external terminal further includes a second shaft that has a diameter smaller than a diameter of the first shaft, and extends from the first shaft to be fixed to the current collector.

3. The electric storage element according to claim 2, wherein the first shaft is inserted into the through hole in the casing, and, with the flange being in contact with the outer surface of the casing, a stepped portion from the second shaft has a height substantially flush with an inner surface of the casing.

4. The electric storage element according to claim 1, wherein the casing comprises a battery case comprising an open surface, and a cover closing the opening of the battery case, and
wherein the through hole of the casing is provided in the cover.

5. The electric storage element according to claim 4, wherein the cover comprises an engagement receiver swelled outward, and the current collector comprises a fitting portion that is located in the engagement receiver and comprises a through hole into which the first shaft is inserted to be welded to the casing.

6. The electric storage element according to claim 4, wherein the external terminal comprises a positive external terminal and electrically connects the cover and the current collector when the current collector is fixed to the cover.

7. The electric storage element according to claim 1, wherein the first shaft is inserted into the through hole in the casing, and a contact portion there between is welded over an entire periphery.

8. The electric storage element according to claim 1, wherein the flange is in a direct contact with the outer surface of the casing.

9. The electric storage element according to claim 1, wherein the outer surface of the casing abuts the flange.

10. The electric storage element according to claim 1, wherein the flange is in an electrical contact with the outer surface of the casing.

11. The electric storage element according to claim 1, wherein the casing comprises a cover that comprises an engagement receiver swelled outward, and
wherein an outer diameter of the first shaft is located in a hole of the engagement receiver provided on the cover without a gap being formed therein.

12. The electric storage element according to claim 1, wherein the external terminal further includes a second shaft, and
wherein the first shaft has a height such that a stepped portion between the first shaft and the second shaft is flush with an inner surface of the cover.

13. The electric storage element according to claim 12, wherein the second shaft is inserted into a hole in the current collector.

14. The electric storage element according to claim 13, wherein the second shaft is caulked in a state where an inner surface of an engagement recess of an engagement receiver on the cover is in a surface contact with an upper surface of the current collector.

* * * * *